United States Patent
Kim

(10) Patent No.: US 10,380,442 B2
(45) Date of Patent: Aug. 13, 2019

(54) IRIS VERIFICATION METHOD

(71) Applicant: 3E CO., LTD, Seongnam-si, Gyeonggi-do (KR)

(72) Inventor: Min Ho Kim, Seongnam-si (KR)

(73) Assignee: 3E CO., LTD., Seongnam-si (KR)

(*) Notice: Subject to any disclaimer, the term of this patent is extended or adjusted under 35 U.S.C. 154(b) by 0 days.

(21) Appl. No.: 15/703,573

(22) Filed: Sep. 13, 2017

(65) Prior Publication Data
US 2018/0173977 A1    Jun. 21, 2018

(30) Foreign Application Priority Data

Dec. 21, 2016    (KR) .................. 10-2016-0175220

(51) Int. Cl.
*G06K 9/00*    (2006.01)
(52) U.S. Cl.
CPC ....... *G06K 9/00899* (2013.01); *G06K 9/0061* (2013.01); *G06K 9/00604* (2013.01); *G06K 9/00617* (2013.01)
(58) Field of Classification Search
CPC .......... G06K 9/00899; G06K 9/00604; G06K 9/00617; G06K 9/0061
USPC ....................................... 382/117
See application file for complete search history.

(56) References Cited

U.S. PATENT DOCUMENTS

2015/0294464 A1*    10/2015    Kim .................. G06K 9/00597
382/117

FOREIGN PATENT DOCUMENTS

| JP | 7-218989 A | 8/1995 |
|---|---|---|
| KR | 2001-0016242 A | 3/2001 |
| KR | 10-2003-0010944 A | 2/2003 |
| KR | 10-2011-0776723 A | 7/2011 |
| KR | 10-1601541 B1 | 3/2016 |
| KR | 101601541 B1 * | 3/2016 |
| WO | 02/35452 A1 | 5/2002 |

OTHER PUBLICATIONS

Office Action issued by the Korean Intellectual Property Office for corresponding Korean Patent Application No. 10-2016-0175220, dated Jul. 11, 2017.
International Search Report issued for corresponding International Patent Application No. PCT/KR2017/008706, dated Nov. 24, 2017.

* cited by examiner

*Primary Examiner* — Amandeep Saini
(74) *Attorney, Agent, or Firm* — Patent Office of Dr. Chung Park

(57) ABSTRACT

An iris verification method is provided. According to the iris verification method, it is possible to determine whether the iris to be authenticated is a real human iris during an iris authentication process. Also, according to the iris verification method, it is possible to determine, with precision, whether iris images to be authenticated are real human iris images.

7 Claims, 5 Drawing Sheets

LED off (FOUR IMAGES)　　LED on (FOUR IMAGES)　　LED off (FOUR IMAGES)　　LED on (FOUR IMAGES)　　LED off (FOUR IMAGES)

IRIS VERIFICATION METHOD

This application claims priority to Korean Patent Application No. 10-2016-0175220, filed on Dec. 21, 2016, and all the benefits accruing therefrom under 35 U.S.C. § 119, the disclosure of which is incorporated herein by reference in its entirety.

BACKGROUND

1. Field

The present disclosure relates to an iris verification method, and more particularly, to an iris verification method capable of determining whether the iris to be authenticated is a real human iris during an iris recognition process.

2. Description of the Related Art

Recently, as the protection of person information becomes an issue of importance online and offline, biometric technology, among other various security technologies, has increasingly attracted attention. Biometric technology refers to technology for authenticating a user by using each individual's unique biometric information such as fingerprints, irises, and veins.

Iris recognition technology, which is a type of biometric technology, uses each individual's unique iris information in user authentication.

However, attempts may be made to illegitimately access iris security systems with printed iris images, contact lens with iris patterns printed thereon, and counterfeit irises, and as a result, a need has arisen for a technique capable of blocking such illegitimate access to iris security systems.

SUMMARY

Exemplary embodiments of the present disclosure provide an iris verification method capable of blocking an illegitimate iris authentication attempt by inducing a user's pupil size to change during an iris authentication process.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present invention provides iris verification method, comprising: receiving images captured with a lighting unit of an iris capturing apparatus turned on and images captured with the lighting unit turned off; calculating radius ratios of the received images, wherein the radius ratios are pupil radius-to-iris radius ratios; calculating radius ratio change rates by sequentially and alternately comparing the radius ratios of the images captured with the lighting unit turned on and the radius ratios of the images captured with the lighting unit turned off; indexing the radius ratio change rates and calculating an average of the indexed radius ratio change rates; and verifying the iris to be authenticated by comparing the average of the indexed radius ratio change rates with a predefined first threshold value and comparing a ratio of a minimum radius ratio change rate to a maximum radius ratio change with a predefined second threshold value.

According to an exemplary embodiment of the present invention, wherein the calculating the radius ratio change rates, comprises; sequentially and alternately arranging the images captured with the lighting unit turned on and the images captured with the lighting unit turned off; and comparing the radius ratios of adjacent images.

According to an exemplary embodiment of the present invention, wherein the calculating the radius ratio change rates, further comprises calculating ratios of the radius ratios of the images captured with the lighting unit turned off to the radius ratios of the images captured with the lighting unit turned on.

According to an exemplary embodiment of the present invention, wherein the calculating the radius ratio change rates, further comprises calculating ratios of the radius ratios of the images captured with the lighting unit turned on to the radius ratios of the images captured with the lighting unit turned off.

According to an exemplary embodiment of the present invention, wherein the obtaining the indexed radius ratio change rates and the calculating the average of the indexed radius ratio change rates, comprise obtaining the indexed radius ratio change rates using the following equation:

$$I_n = |1 - C_n|$$

where $I_n$ denotes indexed radius ratio change rate and $C_n$ denotes radius ratio.

According to an exemplary embodiment of the present invention, wherein the verifying the iris to be authenticated, comprises comparing the average of the indexed radius ratio change rates with the predefined first threshold value and rejecting the iris to be authenticated if the average of the indexed radius ratio change rates is not greater than the predefined first threshold value.

According to an exemplary embodiment of the present invention, wherein the verifying the iris to be authenticated, comprises comparing the ratio of the minimum radius ratio change rate to the maximum radius ratio change rate with the predefined second threshold value if the average of the indexed radius ratio change rates is greater than the predefined first threshold value, and authenticating the iris to be authenticated if the ratio of the minimum radius ratio change rate to the maximum radius ratio change rate is not greater than the predefined second threshold value.

According to an exemplary embodiment of the present invention, wherein the verifying the iris to be authenticated, comprises comparing the ratio of the minimum radius ratio change rate to the maximum radius ratio change rate with the predefined second threshold value if the average of the indexed radius ratio change rates is greater than the predefined first threshold value, and rejecting the iris to be authenticated if the ratio of the minimum radius ratio change rate to the maximum radius ratio change rate is greater than the predefined second threshold value.

According to an another exemplary embodiment of the present invention provide iris verification apparatus, comprising: at least one processor; a memory loading a computer program, which is executed by the processor; and a storage storing a computer program capable of verifying the iris, wherein the computer program capable of verifying the iris, comprises: an operation of receiving images captured with a lighting unit of an iris capturing apparatus turned on and images captured with the lighting unit turned off; an operation of calculating radius ratios of the received images, wherein the radius ratios are pupil radius-to-iris radius ratios; an operation of calculating radius ratio change rates by sequentially and alternately comparing the radius ratios of the images captured with the lighting unit turned on and the radius ratios of the images captured with the lighting unit turned off; an operation of indexing the radius ratio change rates and calculating an average of the indexed radius ratio change rates; and an operation of verifying the iris to be authenticated by comparing the average of the indexed radius ratio change rates with a predefined first threshold value and comparing a ratio of a minimum radius ratio change rate to a maximum radius ratio change with a predefined second threshold value.

According to exemplary embodiments of the present disclosure, it is possible to precisely determine whether the iris to be authenticated is a real human iris.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
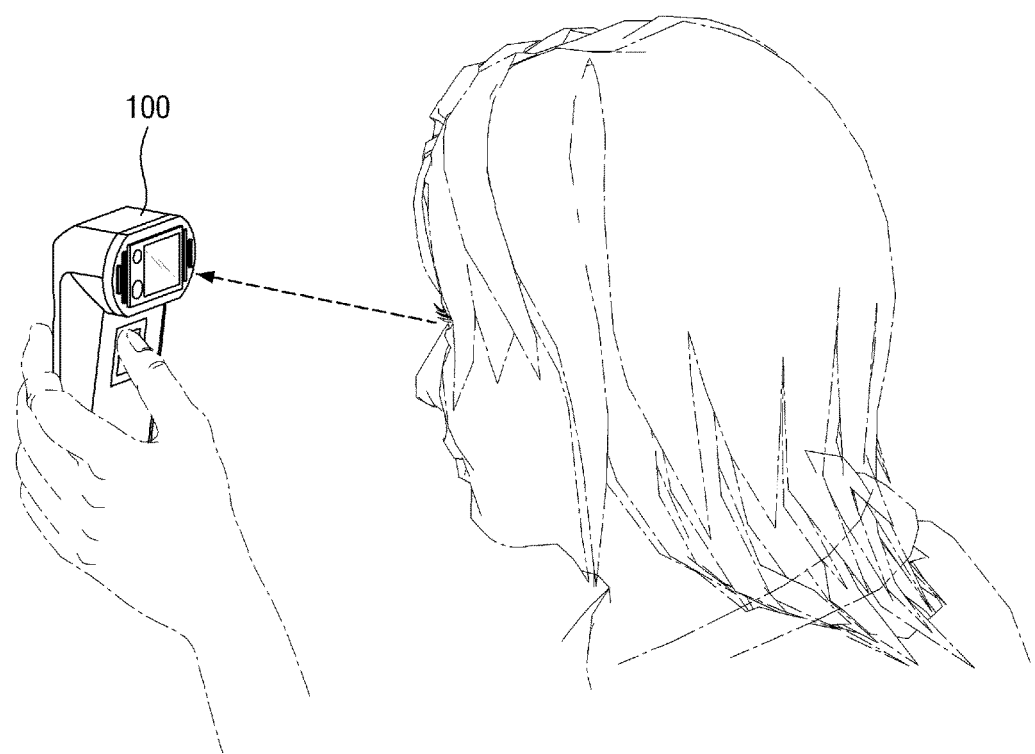
FIG. 1 is a schematic view illustrating an iris authentication process according to an exemplary embodiment of the present disclosure.

Hereinafter, exemplary embodiments of the present disclosure will be described in detail with reference to the accompanying drawings. Advantages and features of the present disclosure and methods to achieve them will become apparent from the descriptions of exemplary embodiments herein below with reference to the accompanying drawings. However, the present invention is not limited to exemplary embodiments disclosed herein but may be implemented in various different ways. The exemplary embodiments are provided for making the disclosure of the present invention thorough and for fully conveying the scope of the present invention to those skilled in the art. It is to be noted that the scope of the present invention is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Unless specifically mentioned otherwise, a singular form may include a plural form in the present specification. Throughout this specification, the word "comprise" and variations such as "comprises" or "comprising," will be understood to imply the inclusion of stated constituents, steps, operations and/or elements but not the exclusion of any other constituents, steps, operations and/or elements.

FIG. 1 is a schematic view illustrating an iris authentication process according to an exemplary embodiment of the present disclosure.

Captured images of a user's eye area, which are necessary for iris authentication, may be acquired by an iris capturing apparatus 100. To this end, the iris capturing apparatus 100 may include a capturing unit and a lighting unit, which illuminates the user's eye area.

The user may capture an image of his or her eye area by holding the iris capturing apparatus 100 and placing the iris capturing apparatus 100 near his or her eye area. The iris capturing apparatus 100 may be implemented in various shapes other than that illustrated in FIG. 1.

That is, the iris capturing apparatus 100 may be fixedly installed in a predetermined space, and the user may approach the iris capturing apparatus 100 to have an image of his or her eye area captured.

When the iris capturing apparatus 100 is capturing an image of the user's eye area, the lighting unit of the iris capturing apparatus 100 may be repeatedly turned on and off to induce the user's pupil size to change.

The inducing of the user's pupil size to change by turning on and off the lighting unit of the iris capturing apparatus 100 will hereinafter be described.

Figure 2:
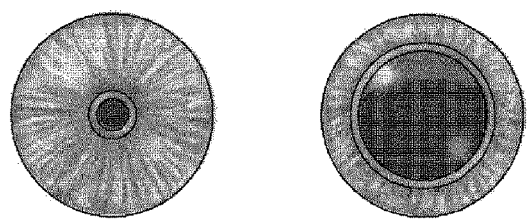
FIG. 2 is a schematic view illustrating a process of inducing a user's pupil size to change according to an exemplary embodiment of the present disclosure.

FIG. 2 is a schematic view illustrating a process of inducing a user's pupil size to change according to an exemplary embodiment of the present disclosure The pupil is a path through which external light can reach the optic nerve of the retina. When viewed from outside, the pupil appears black because light entering the pupil is absorbed into the eyeball and is not reflected.

The pupil is contracted or expanded by the surrounding muscle tissues, and as a result, the size of the pupil changes so that light entering the eye can be controlled. Specifically, referring to FIG. 2, in bright light, the size of the pupil becomes smaller than usual to reduce the amount of light reaching the retina.

On the other hand, in the dark, the pupil is widened to increase the amount of light reaching the retina.

By using the fact that the size of the pupil varies depending on the amount of external light, a determination can be made as to whether the eye to be subject to iris authentication is a real human eye.

Figure 3:
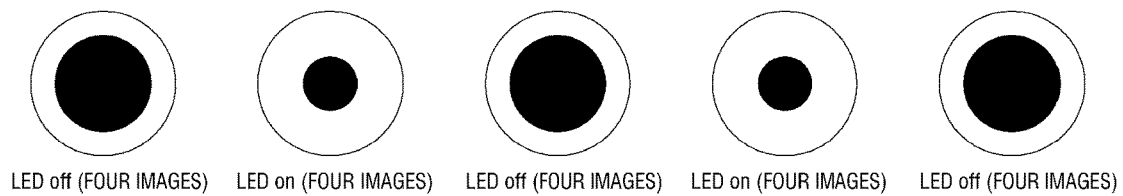
FIG. 3 is a schematic view illustrating a process of receiving captured images of a user's eye area according to an exemplary embodiment of the present disclosure.

FIG. 3 is a schematic view illustrating a process of receiving captured images of a user's eye area according to an exemplary embodiment of the present disclosure.

An iris verification method according to an exemplary embodiment of the present disclosure will hereinafter be described. The iris verification method according to an exemplary embodiment of the present disclosure may be performed by an electronic device having a program installed therein for executing the iris verification method according to an exemplary embodiment of the present disclosure. The electronic device may be implemented as a general-purpose device having computing resources.

The iris verification method according to an exemplary embodiment of the present disclosure includes receiving one or more images of the user's eye area, captured with the lighting unit turned on, and one or more images of the user's eye area, captured with the lighting unit turned off. Specifically, a plurality of images of the user's eye area, captured with the lighting unit turned on, and a plurality of images of the user's eye area, captured with the lighting unit turned off, may be received.

The iris capturing apparatus 100 may capture a plurality of images by repeatedly switching the lighting unit between an "on" state and an "off" state.

For example, referring to FIG. 3, a plurality of images, which are obtained by repeatedly capturing four images in series with the lighting unit turned on and then four images in series with the lighting unit turned off, may be received.

In the iris verification method according to an exemplary embodiment of the present disclosure, a total of twenty images may be received, and a determination may be made as to whether the eye to be subject to iris authentication is a real human eye based on the received twenty images.

Figure 4:
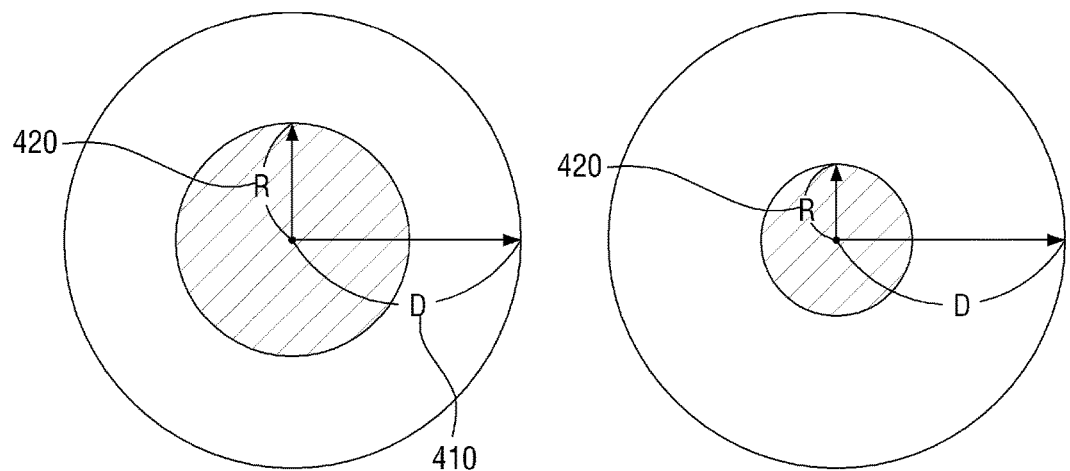
FIG. 4 is a schematic view illustrating captured images of a user's eye area for explaining iris radius and pupil radius.

FIG. 4 is a schematic view illustrating captured images of a user's eye area for explaining iris radius and pupil radius.

Referring to FIG. 4, iris radius 410 indicates the distance between the center of the pupil and the boundary between the iris and the sclera, and pupil radius 420 indicates the distance between the center of the pupil and the boundary between the pupil and the iris.

The size of the iris is uniform regardless of the amount of external light entering the eye. Thus, the iris radius 410 is almost uniform in all images.

On the other hand, the size of the pupil varies depending on the amount of external light entering the eye. The pupil radius 420 may differ from images captured with the lighting unit turned on to images captured with the lighting unit turned off.

In the iris verification method according to an exemplary embodiment of the present disclosure, a determination may be made as to whether iris images to be authenticated are real human iris images based on the fact that the pupil radius 420 varies depending on the amount of external light entering the eye.

Figure 5:
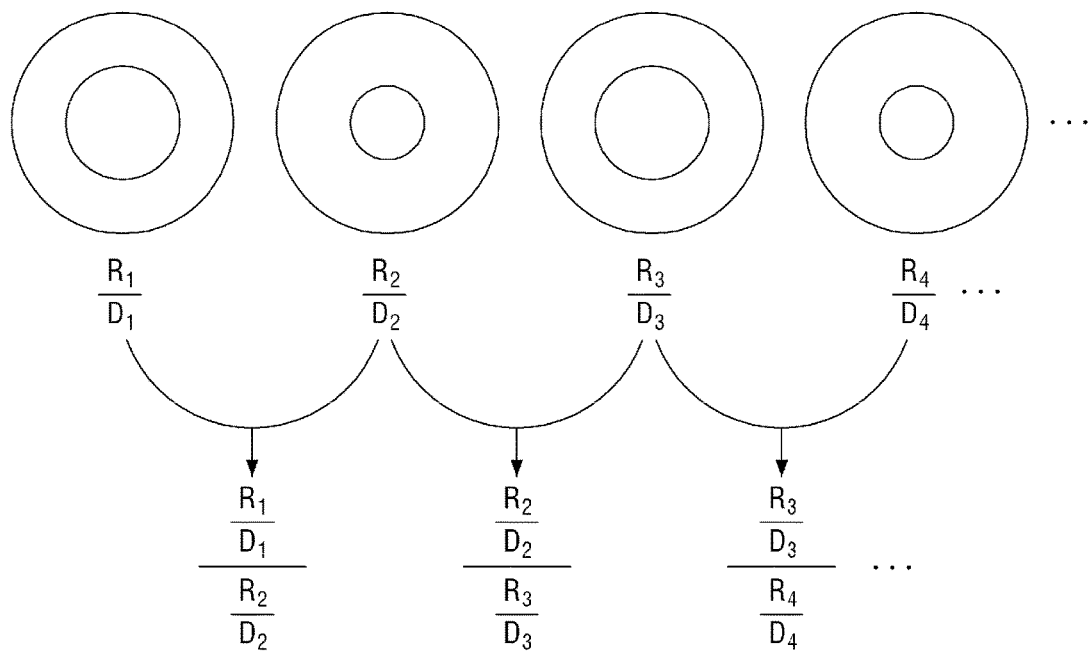
FIG. 5 is a schematic view illustrating a process of calculating a variation in the ratio of pupil radius to iris radius.

FIG. 5 is a schematic view illustrating a process of calculating a variation in the ratio of pupil radius to iris radius.

Referring to FIG. 5, the ratio of the pupil radius 420 to the iris radius 410 of each image is calculated. The ratio of the pupil radius 420 to the iris radius 410 will hereinafter be referred to as radius ratio.

Radius ratio may be calculated by Equation (1):

$$\text{Ratio} = \frac{R}{D} \qquad (1)$$

where D denotes the iris radius 410 and R denotes the pupil radius 420.

Thereafter, radius ratio variations are calculated by sequentially and alternately comparing the radius ratios of images captured with the lighting unit turned on and the radius ratios of images captured with the lighting unit turned off.

Specifically, the images captured with the lighting unit turned on and the images captured with the lighting unit turned off are sequentially and alternately arranged in a row, then radius ratio variations are calculated by comparing the radius ratios of adjacent images.

For example, a plurality of images, including first, second, third, and fourth images 510, 520, 530, and 540, may be sequentially arranged, as illustrated in FIG. 5. Then, the radius ratio of the first image 510, which is an image captured with the lighting unit turned off and the radius ratio of the second image 520, which is an image captured with the lighting unit turned on are compared, and the radius ratio of the third image 530, which is an image captured with the lighting unit turned off, and the radius ratio of the fourth image 540, which is an image captured with the lighting unit turned on, may be compared.

Radius ratio change rate may be calculated by Equation (2):

$$C_n = \frac{\frac{R_n}{D_n}}{\frac{R_{n+1}}{D_{n+1}}} \qquad (2)$$

where $C_n$ denotes radius ratio change rate and n-th and (n+1)-th images may be images obtained by varying the operating state of the lighting unit.

For example, if odd-numbered images are images captured with the lighting unit turned on, even-numbered images may be images captured with the lighting unit turned off. On the other hand, if odd-numbered images are images captured with the lighting unit turned off, even-numbered images may be images captured with the lighting unit turned on.

If there are N captured images obtained by varying the operating state of the lighting unit of the iris capturing apparatus 100, a total of N−1 radius ratio change rates may be obtained.

Then, in the iris verification method according to an exemplary embodiment of the present disclosure, the N−1 radius ratio change rates may be indexed.

Figure 6:
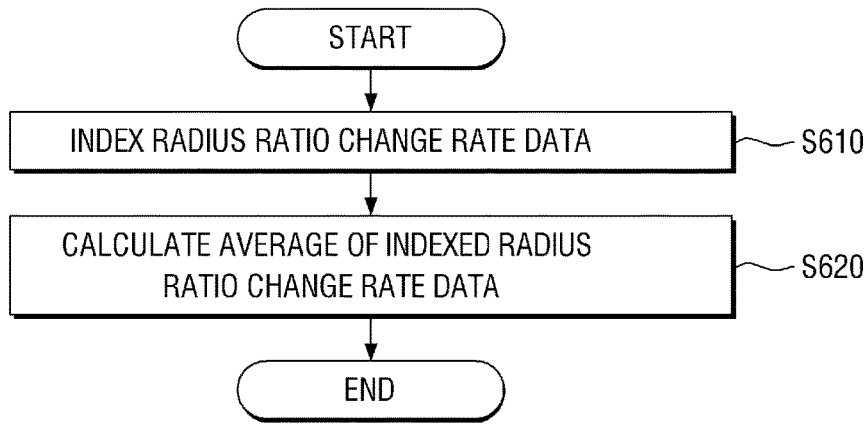
FIG. 6 is a flowchart illustrating processes of indexing radius ratio change rate data and calculating the average of the indexed radius ratio change data according to an exemplary embodiment of the present disclosure.

FIG. 6 is a flowchart illustrating processes of indexing radius ratio change rate data and calculating the average of the indexed radius ratio change data according to an exemplary embodiment of the present disclosure.

Referring to FIG. 6, ratio change rate data obtained by the process of FIG. 5 may be indexed (S610).

Specifically, the ratio change rate data obtained by the process of FIG. 5 may be indexed, as shown in Equation (3):

$$I_n = |1 - C_n| \qquad (3)$$

where $I_n$ denotes indexed radius ratio change rate. If there are N radius ratio change rates, N indexed radius ratio change rates may be obtained.

The radius ratio change rate $C_n$ represents the rate of change of pupil radius when the lighting unit is turned on and off, and the greater the radius ratio change rate $C_n$ the greater the rate of change of pupil radius.

The greater the rate of change of pupil radius, the greater the radius ratio change rate $C_n$. Thus, as the rate of change of pupil radius increases, the indexed radius ratio change rate $I_n$ calculated by Equation (3) decreases.

Thereafter, the average of the indexed radius ratio change rate data obtained in S610 is calculated (S620).

An indexed radius ratio change rate data average $L_1$ may be calculated by Equation (4):

$$L_1 = \frac{I_1 + I_2 + I_3 + \ldots + I_N}{N} \quad (4)$$

where N denotes the number of indexed radius ratio change rates.

Once the indexed radius ratio change rate data average $L_1$ is calculated, a determination is made as to whether captured images to be authenticated are real iris images based on the indexed radius ratio change rate data average $L_1$.

Figure 7:
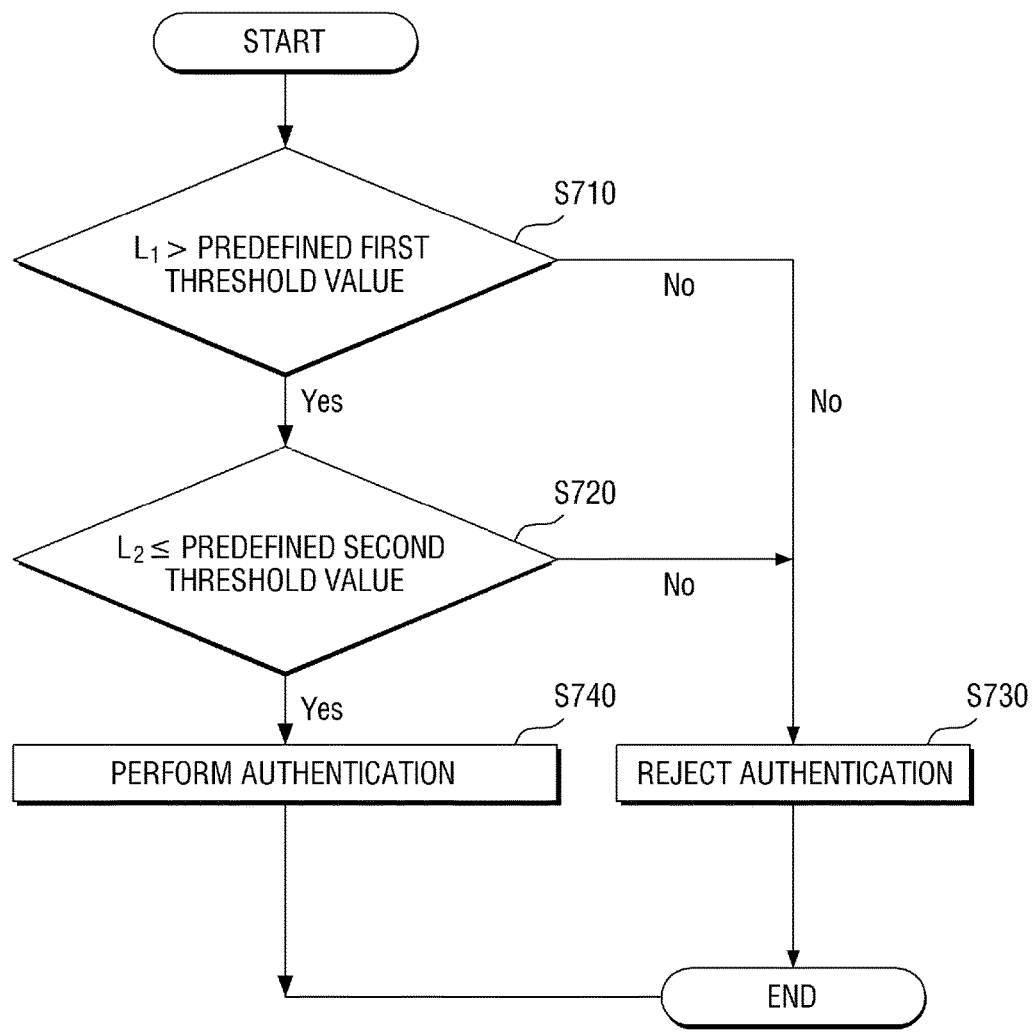
FIG. 7 is a flowchart illustrating an iris verification process using the average of indexed radius ratio change rate data and maximum and minimum radius ratio change rates according to an exemplary embodiment of the present disclosure.

FIG. 7 is a flowchart illustrating an iris verification process using the average of indexed radius ratio change rate data and maximum and minimum radius ratio change rates according to an exemplary embodiment of the present disclosure.

Referring to FIG. 7, once the indexed radius ratio change rate average $L_1$ is calculated, the indexed radius ratio change rate average $L_1$ is compared with a predefined first threshold value (S710). If the indexed radius ratio change rate average $L_1$ is not greater than the predefined first threshold value, it is determined that captured iris images to be authenticated are not real iris images, and the captured iris images to be authenticated are rejected (S730).

In S710, the indexed radius ratio change rate average $L_1$ is compared with the predefined first threshold value to exclude any pupil radius change rate that exceeds the rate of change of the real human pupil radius.

As described above with reference to FIG. 6, the greater the rate of change of pupil radius, the smaller the indexed radius ratio change rate average $L_1$. On the other hand, the smaller the rate of change of pupil radius, the greater the indexed radius ratio change rate average $L_1$. Thus, as the indexed radius ratio change rate average $L_1$ increases, the rate of change of pupil radius decreases.

As described above, in a case where the indexed radius ratio change rate average $L_1$ is not greater than the predefined first threshold value, the captured iris images to be authenticated are rejected because a pupil radius change rate that exceeds the rate of change of the real human pupil radius is determined to be associated with an artificial manipulation of pupil size, rather than with a normal pupillary response to light.

If the indexed radius ratio change rate average $L_1$ is greater than the predefined first threshold value, a ratio $L_2$ of a minimum radius ratio change rate $C_{MIN}$ to a maximum radius ratio change rate $C_{MAX}$ is compared with a predefined second threshold value (S720).

The ratio $L_2$ may be calculated by Equation (5):

$$L_2 = \frac{C_{MIN}}{C_{MAX}}. \quad (5)$$

If the ratio $L_2$ is not greater than the predefined second threshold value, it is determined that the iris to be authenticated is a real human iris, and the iris to be authenticated is authenticated (S740). On the other hand, if the ratio $L_2$ is greater than the second threshold value, the iris to be authenticated is rejected (S730).

The greater the rate of change of pupil radius, the smaller the ratio $L_2$. That is, a large ratio $L_2$ means a small rate of change of pupil radius.

The greater the rate of change of pupil radius, the greater the maximum radius ratio change rate $C_{MAX}$, and the smaller the minimum radius ratio change rate $C_{MIN}$ because the ratio $L_2$ represents the ratio of the minimum radius ratio change rate $C_{MIN}$ to the maximum radius ratio change rate $C_{MAX}$.

As described above, by using the indexed radius ratio change rate average $L_1$ and the ratio $L_2$, it is possible to precisely determine whether iris images to be authenticated are real human iris images.

Figure 8:
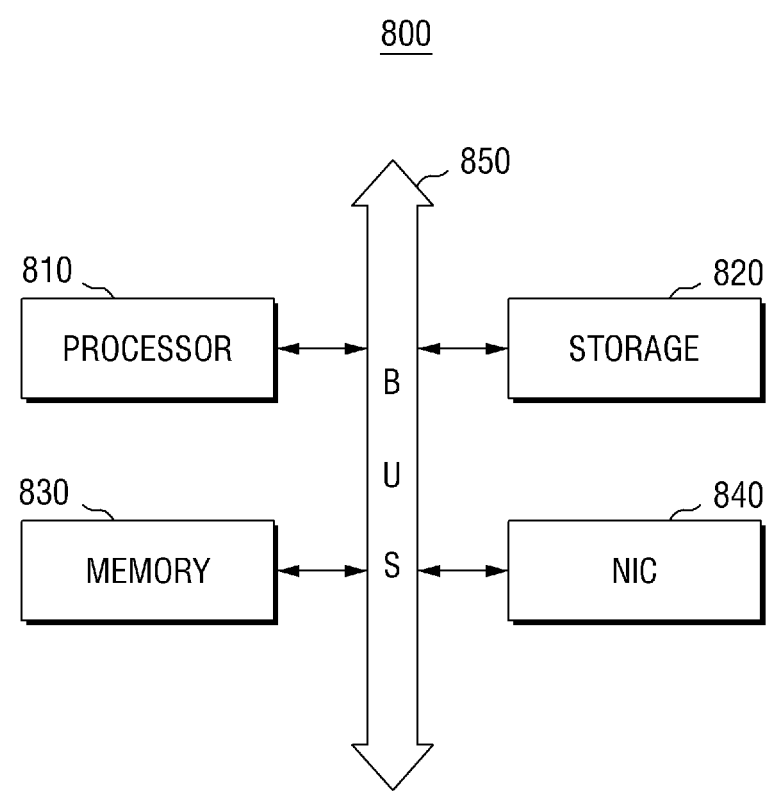
FIG. 8 is a block diagram illustrating an iris verification apparatus according to an exemplary embodiment of the present disclosure.

FIG. 8 is a block diagram illustrating an iris verification apparatus according to an exemplary embodiment of the present disclosure.

Referring to FIG. 8, an iris verification apparatus 800 includes a processor 810, a storage 820, a memory 830, a network interface "NIC" 840, and a bus 850.

FIG. 8 illustrates only components relevant to exemplary embodiments of the present disclosure, but it is obvious to a person skilled in the art that the iris verification apparatus 800 may also include other universal components.

The processor 810 executes a program capable of verifying the iris. However, the type of program that can be executed by the processor 810 is not particularly limited, and other universal programs can be executed by the processor 810.

The storage 820 stores the program capable of verifying the iris. According to an exemplary embodiment of the present disclosure, the program, when executed, causes a computer to perform: an operation of receiving images captured with a lighting unit of an iris capturing apparatus turned on and images captured with the lighting unit turned off; an operation of calculating radius ratios of the received images, wherein the radius ratios are pupil radius-to-iris radius ratios; an operation of calculating radius ratio change rates by sequentially and alternately comparing the radius ratios of the images captured with the lighting unit turned on and the radius ratios of the images captured with the lighting unit turned off; an operation of indexing the radius ratio change rates and calculating an average of the indexed radius ratio change rates; and an operation of verifying the iris to be authenticated by comparing the average of the indexed radius ratio change rates with a predefined first threshold value and comparing a ratio of a minimum radius ratio change rate to a maximum radius ratio change with a predefined second threshold value.

The memory 830 may load the program capable of verifying the iris so that the program is executed on the processor 810.

The network interface 840 may be connected to a computing device.

The bus 850 works as a data transfer path among the processor 810, the storage 820, the memory 830, and the network interface 840.

The above-described method may be implemented as a program that can be executed by a computer, and may be embodied in a computer-readable storage medium to be performed in a general-purpose digital computer that executes the program. In addition, the structure of the data used in the above-described method may be written on a computer-readable storage medium through various means. The computer-readable storage medium includes a storage medium such as a magnetic storage medium (e.g., a ROM, a floppy disk, a hard disk, etc.), and an optical recording medium (e.g., CD-ROM, a DVD, etc.).

It is to be understood that various modifications and changes may be made to the exemplary embodiments of the present disclosure without departing from the gist of the present disclosure. Therefore, the disclosed methods should be interpreted in an illustrative sense rather than a restrictive sense. The scope of the present disclosure is defined solely by the appended claims not by the foregoing description, and all modifications, equivalents and alternatives also is fall within the scope of the present disclosure.

What is claimed is:

1. An iris verification method, comprising:
receiving images captured with a lighting unit of an iris capturing apparatus turned on and images captured with the lighting unit turned off;
calculating radius ratios of the received images, wherein the radius ratios are pupil radius-to-iris radius ratios;
calculating radius ratio change rates by sequentially and alternately comparing the radius ratios of the images captured with the lighting unit turned on and the radius ratios of the images captured with the lighting unit turned off;
indexing the radius ratio change rates and calculating an average of the indexed radius ratio change rates; and
verifying the iris to be authenticated by comparing the average of the indexed radius ratio change rates with a predefined first threshold value and comparing a ratio of a minimum radius ratio change rate to a maximum radius ratio change with a predefined second threshold value,
wherein the obtaining the indexed radius ratio change rates and the calculating the average of the indexed radius ratio change rates, comprise obtaining the indexed radius ratio change rates using the following equation:

$$I_n = |1 - C_n|$$

where $I_n$ denotes indexed radius ratio change rate and $C_n$ denotes radius ratio.

2. The iris verification method of claim 1, wherein the calculating the radius ratio change rates, comprises sequentially and alternately arranging the images captured with the lighting unit turned on and the images captured with the lighting unit turned off and comparing the radius ratio of adjacent images.

3. The iris verification method of claim 2, wherein the calculating the radius ratio change rates, further comprises calculating ratios of the radius ratios of the images captured with the lighting unit turned off to the radius ratios of the images captured with the lighting unit turned on.

4. The iris verification method of claim 2, wherein the calculating the radius ratio change rates, further comprises calculating ratios of the radius ratios of the images captured with the lighting unit turned on to the radius ratios of the images captured with the lighting unit turned off.

5. The iris verification method of claim 1, wherein the verifying the iris to be authenticated, comprises comparing the average of the indexed radius ratio change rates with the predefined first threshold value and rejecting the iris to be authenticated if the average of the indexed radius ratio change rates is not greater than the predefined first threshold value.

6. The iris verification method of claim 5, wherein the verifying the iris to be authenticated, comprises comparing the ratio of the minimum radius ratio change rate to the maximum radius ratio change rate with the predefined second threshold value if the average of the indexed radius ratio change rates is greater than the predefined first threshold value, and authenticating the iris to be authenticated if the ratio of the minimum radius ratio change rate to the maximum radius ratio change rate is not greater than the predefined second threshold value.

7. The iris verification method of claim 5, wherein the verifying the iris to be authenticated, comprises comparing the ratio of the minimum radius ratio change rate to the maximum radius ratio change rate with the predefined second threshold value if the average of the indexed radius ratio change rates is greater than the predefined first threshold value, and rejecting the iris to be authenticated if the ratio of the minimum radius ratio change rate to the maximum radius ratio change rate is greater than the predefined second threshold value.

* * * * *